(12) United States Patent
Begin (10) Patent No.: US 7,364,365 B2
(45) Date of Patent: Apr. 29, 2008

(54) CONRAD BEARING CAGE

(75) Inventor: Louis P. Begin, Chandler, AZ (US)

(73) Assignee: Honeywell International, Inc., Morristown, NJ (US)

( * ) Notice: Subject to any disclaimer, the term of this patent is extended or adjusted under 35 U.S.C. 154(b) by 175 days.

(21) Appl. No.: 11/001,452

(22) Filed: Dec. 1, 2004

(65) Prior Publication Data

US 2006/0115193 A1    Jun. 1, 2006

(51) Int. Cl.
*F16C 33/38* (2006.01)

(52) U.S. Cl. ........................ 384/530; 384/523

(58) Field of Classification Search ......... 384/523–534
See application file for complete search history.

(56) References Cited

U.S. PATENT DOCUMENTS

| | | | |
|---|---|---|---|
| 1,013,151 A | | 1/1912 | Foster |
| 1,013,518 A | * | 1/1912 | Schilling .................... 384/526 |
| 3,685,877 A | | 8/1972 | Gould |
| 3,980,352 A | | 9/1976 | Carlson |
| 4,076,343 A | | 2/1978 | McCloskey |
| 4,626,113 A | | 12/1986 | Forknall et al. |
| 4,647,230 A | | 3/1987 | Friedrich et al. |
| 4,723,851 A | | 2/1988 | Troster et al. |
| 4,729,154 A | * | 3/1988 | Gilbert .................. 29/898.062 |
| 5,352,047 A | | 10/1994 | Ingall et al. |
| 5,356,227 A | | 10/1994 | Sibley et al. |
| 5,642,945 A | * | 7/1997 | Abe ........................... 384/470 |
| 5,707,153 A | | 1/1998 | Steinberger et al. |
| 5,722,780 A | | 3/1998 | Scharman |
| 5,779,020 A | | 7/1998 | Hargarten |
| 6,164,831 A | | 12/2000 | Matsui et al. |
| 6,315,456 B1 | * | 11/2001 | Tanimoto et al. ........... 384/527 |
| 6,416,230 B1 | | 7/2002 | Staudigel et al. |
| 6,742,934 B2 | * | 6/2004 | Matsuyama et al. ........ 384/572 |
| 6,969,235 B2 | * | 11/2005 | Feest .......................... 384/523 |
| 2002/0110298 A1 | * | 8/2002 | Tada .......................... 384/523 |

OTHER PUBLICATIONS

The Barden Corporation, "Barden Precision Cages for Spindle, Turbine, Miniature and Instrument Ball Bearings", Apr. 1998, pp. 1-9, Danbury, Connecticut, U.S.A.
The Barden Corporation, "Bearing in Mind: Precision Ball Bearing Basics", Jun. 1998, pp. 1-16, Danbury, Connecticut, U.S.A.

* cited by examiner

*Primary Examiner*—Thomas R. Hannon
(74) *Attorney, Agent, or Firm*—Ingrassia, Fisher & Lorenz, P.C.

(57) ABSTRACT

The present invention provides a method and apparatus for retaining bearing balls in a bearing assembly. For example, a cage assembly may comprise an annular cage having a plurality of pockets in which to snap-in bearing balls via openings having a width less than the diameter of the bearing balls. A retainer ring for the cage may have an inner diameter that is equal to the inner diameter of the cage. The cage assembly may comprise a plurality of cage webs, wherein each cage web is located between two adjacent pockets, and each cage web may be tapered (either radially, axially, or both radially and axially). The plurality of cage webs may be tapered such that the cage webs are tapered towards a distal end of each cage web and away from a proximal end of each cage web. An outer land may pilot the bearing assembly.

12 Claims, 7 Drawing Sheets

CONRAD BEARING CAGE

BACKGROUND OF THE INVENTION

The present invention relates generally to a rolling element bearing for high-speed rotating equipment and, more particularly, to bearing assemblies and methods for retaining a bearing ball within a bearing assembly.

Various forms of ball retainers or cages for use with bearing balls exist. Many of these cages are annular members with pockets for separating and retaining the bearing balls. In operation of a bearing with such a cage, a ring, concentric with the cage, is driven to rotate the bearing balls and to drive the bearing balls in the direction of ring rotation. In turn, the bearing balls may engage the pockets to drive the cage or the cage may drive the bearing balls.

Ideally, there is substantially point contact between a bearing ball and the wall of a pocket in the direction of the movement of the cage. However, as the bearing balls move circumferentially, axial thrust loading combined with varying radial forces can cause the bearing balls to move away from an intended circumferential path ("excursions"). These excursions can lead to undesirable rolling resistance, non-uniform rotation and orbital velocities, and excessive wear of moving parts (such as bearing balls, raceways, and especially the cage). Additionally, due to mechanical imperfections, such as bearing ball imperfections and raceway imperfections, and system induced vibrations, the bearing balls also contact the wall of a cage pocket in an axial direction resulting in undesirable resistance to rolling movement, excessive cage forces, and instability of rotation.

U.S. Pat. No. 1,013,518 to Schilling appears to describe a cage ring for bearing balls. An elastic retaining ring, with an inner diameter larger than the inner diameter of the cage ring, is needed to retain the bearing balls. Because the retaining ring is elastic, large axial cage forces cannot be adequately reacted. The mean diameter of the retaining ring is larger than the pitch diameter of the bearing balls, making adequate reaction to large axial cage forces difficult. Furthermore, at high speeds, centrifugal forces acting on the large elastic retaining ring may exacerbate the tendency for portions of the cage to flare out radially. Such flaring may lead to rubbing of the cage against moving parts.

Another attempt to retain bearing balls is shown in U.S. Pat. No. 4,626,113 to Forknall ('113 patent). A plastic bearing ball cage is snapped together from two halves. No structure is shown for preventing the cage from snapping apart during operation. The bearing assembly of the '113 patent uses a ball-piloted cage, i.e., the bearing assembly is piloted (guided) by the bearing balls. A ball-piloted cage cannot accommodate ball excursions due to the small pocket clearance required to pilot the cage. As a result, the cage would undergo large ball pocket forces during high speed rotation of the bearing assembly.

As can be seen, there is a need for an improved apparatus and methods for retaining bearing balls in a bearing assembly such that excursions and other non-uniform movements of the bearing balls under high-speed rotation of the bearing assembly can be accommodated.

SUMMARY OF THE INVENTION

In one aspect of the present invention, a bearing assembly comprises a plurality of bearing balls; a cage, including a plurality of pockets for receiving the bearing balls and a plurality of cage webs wherein each cage web is located between an adjacent pair of the pockets; wherein an opening between an adjacent pair of the cage webs is less than a diameter of the bearing balls.

In another aspect of the present invention, a bearing assembly comprises a plurality of bearing balls; a cage, including a plurality of pockets for receiving the bearing balls and a plurality of cage webs wherein each cage web is located between an adjacent pair of the pockets; an inner raceway concentric with the cage; an outer raceway concentric with the cage and the inner raceway; and a retaining ring concentric with the cage, the inner raceway, and the outer raceway; wherein a cage pilot clearance is located between the outer raceway and the cage; wherein a cage non-pilot clearance is located between the inner raceway and the cage; and wherein the cage non-pilot clearance is greater than the cage pilot clearance.

In a further aspect of the present invention, a bearing assembly comprises a plurality of bearing balls; a cage, including a plurality of pockets for receiving the bearing balls and a plurality of tapered cage webs wherein each tapered cage web is located between an adjacent pair of the pockets; an inner raceway concentric with the cage; an outer raceway concentric with the cage and the inner raceway; and a retaining ring concentric with the cage, the inner raceway, and the outer raceway; wherein an opening between an adjacent pair of the tapered cage webs is less than a diameter of the bearing balls.

In still another aspect of the present invention, a bearing assembly comprises a plurality of bearing balls; a cage, including a plurality of pockets for receiving the bearing balls and a plurality of cage webs wherein each cage web is located between an adjacent pair of the pockets; an inner raceway concentric with the cage; an outer raceway concentric with the cage and the inner raceway; and a retaining ring concentric with the cage, the inner raceway, and the outer raceway; wherein a pitch diameter of the bearing balls is greater than an inner diameter of the retaining ring.

In a still further aspect of the present invention, a bearing assembly comprises a plurality of bearing balls; a cage, including a plurality of pockets for receiving the bearing balls and a plurality of tapered cage webs wherein each tapered cage web is located between an adjacent pair of the pockets; an inner raceway concentric with the cage; an outer raceway concentric with the cage and the inner raceway; and a retaining ring concentric with the cage, the inner raceway, and the outer raceway; wherein the retaining ring comprises two free ends.

In yet another aspect of the present invention, a bearing assembly comprises a plurality of bearing balls; a cage, including a cage relief surface, a cage pilot surface, a plurality of pockets for receiving the bearing balls, and a plurality of tapered cage webs wherein each tapered cage web is located between an adjacent pair of the pockets; an inner raceway concentric with the cage; an outer raceway concentric with the cage and the inner raceway; and a retaining ring concentric with the cage, the inner raceway, and the outer raceway; wherein an opening between an adjacent pair of the tapered cage webs is less than a diameter of one of the plurality of bearing balls; wherein a cage relief radius, measured radially from the cage center to the cage relief surface, is less than a cage pilot radius measured radially from the cage center to the cage pilot surface.

In another aspect of the present invention, a gas turbine engine comprises a shaft; and a rolling element bearing coupled to the shaft; the rolling element bearing comprising; a plurality of bearing balls; a cage, including a plurality of pockets for receiving the bearing balls and a plurality of cage webs wherein each cage web is located between an adjacent pair of the pockets; an inner raceway concentric with the cage and radially inward from the cage; an outer raceway concentric with the cage and radially outward from the cage; and a retaining ring affixed to the cage; wherein an opening between an adjacent pair of the cage webs is less than a diameter of the bearing balls.

In a further aspect of the present invention, a cage comprises a plurality of pockets adapted for receiving bearing balls; a plurality of cage webs wherein each cage web is located between an adjacent pair of the pockets; and a retaining ring for retaining the bearing balls within the pockets; wherein an annular groove is formed in an inner face of each of the plurality of cage webs and wherein the annular groove is adapted for receiving the retaining ring, and an inner face is flush with an inner diameter of the retaining ring.

In a still further aspect of the present invention, a bearing assembly comprises a plurality of bearing balls; a cage for retaining the plurality of bearing balls; an inner raceway concentric with the cage and radially inward from the cage; an outer raceway concentric with the cage and radially outward from the cage; and a retaining ring affixed to the cage; and the cage including: a plurality of pockets for receiving said bearing balls; and a plurality of cage webs, each said cage web located between an adjacent pair of the pockets; wherein a cage pilot clearance is located between the outer raceway and an outer circumference of the cage; wherein a cage non-pilot clearance is located between the inner raceway and the cage.

In yet a another aspect of the present invention, a method of retaining a plurality of bearing balls within a bearing assembly comprises: holding bearing balls in a cage assembly situated between the outer diameter of an inner raceway and the inner diameter of an outer raceway, wherein the cage assembly includes: a plurality of pockets for receiving the bearing balls; and a plurality of tapered cage webs wherein each cage web is located between an adjacent pair of the pockets; wherein a distance between an adjacent pair of the cage webs is less than a diameter of the bearing balls; retaining the bearing balls with a retaining ring snapped into an annular groove formed in an inner face of each of the plurality of cage webs; and piloting the bearing assembly on the outer diameter of the cage by the inner diameter of the outer raceway.

In still yet another aspect of the present invention, a method of cage retention comprises piloting an outer diameter of a cage assembly by a land of an outer raceway, wherein the cage assembly includes: a plurality of pockets for receiving the bearing balls; and a plurality of tapered cage webs wherein each cage web is located between an adjacent pair of the pockets; retaining the cage assembly by using an opening between adjacent tapered cage webs that is smaller than the bearing ball diameter; and retaining the cage assembly by inserting a retaining ring into an annular groove formed in an inner face of each of the plurality of tapered cage webs.

These and other aspects, objects, features and advantages of the present invention, are specifically set forth in, or will become apparent from, the following detailed description of an exemplary embodiment of the invention when read in conjunction with the accompanying drawings.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention may be useful for bearing assemblies of rotating machinery. The present invention may be used in applications requiring high-speed rotation, such as in electronic, medical, food-processing, automotive equipment, or aerospace equipment. The invention may also be used in Conrad bearing applications for turbine engines, including auxiliary power units.

Prior art bearing assemblies may pilot (guide) cage radial movement with the bearing balls on an inner raceway or ring. Such piloting designs cannot accommodate bearing ball excursions and pocket forces in high-speed rotating machinery. The present invention may use a gap between an inner diameter of an outer raceway or ring and an outer diameter of a cage that is smaller in size than a gap between an outer diameter of an inner raceway and an inner diameter of the cage. Selecting this gap relation may be useful to pilot the cage assembly on the inner diameter of the outer raceway, which is advantageous for high-speed rotation.

Furthermore, prior art cage assemblies may use untapered cage webs and gaps between cage webs that are not smaller than the ball bearing diameter. The present invention may provide tapered cage webs and cage web gaps that are smaller than the ball bearing diameter, enabling a snap insertion and removal of bearing balls from cage pockets. The snap features may tend to prevent unintended excursions or dislocations of bearing balls from forces at high rotational speeds.

Prior art bearing assemblies may use retaining rings with an inner diameter that is greater than an inner diameter of the cage. At high speeds, if such a larger retaining ring has a large mass, then the retaining ring tends to promote flaring of the cage webs from centrifugal forces. The present invention may use a retaining ring with an inner diameter that is equal to an inner diameter of the cage. Such a smaller retaining ring (in relation to a cage inner diameter), in which a cage inner diameter may be equal to a retaining ring inner diameter, may tend to reduce flaring of the cage webs caused by centrifugal forces because the retaining ring is closer to the center of the cage and bearing assembly. Thus, the retaining ring may serve as a secondary instrument for retaining the bearing balls (in case the bearing balls cannot be retained by the primary instrument, the snap feature) without contributing to non-uniform movement of the cage and excessive wear of moving surfaces.

Additionally, prior art bearing assemblies may use retaining rings that are formed in a single integral circle of elastic material. These rings, which may be installed over outer diameter grooves or inner diameter grooves, are elastic for ease of assembly. This same elasticity would not be strong enough to prevent cage failure from high transient axial forces, which occur under conditions of combined axial and radial bearing loads. The present invention may use a retaining ring that is not an integral circle, but a wire in a circular or oval shape with free ends. The free ends allow for the assembly of the retaining ring into the grooves of the cage webs by "winding" the ring into place. Since the retaining ring may be made of a strong metallic material, such as steel, it can easily resist high axial ball forces. The retaining ring may have an oval cross-section. The cage groove may be an annular groove formed in an inner face of each of the plurality of cage webs. The cage groove may be adapted to have a size for snugly receiving the retaining ring.

Figure 1:
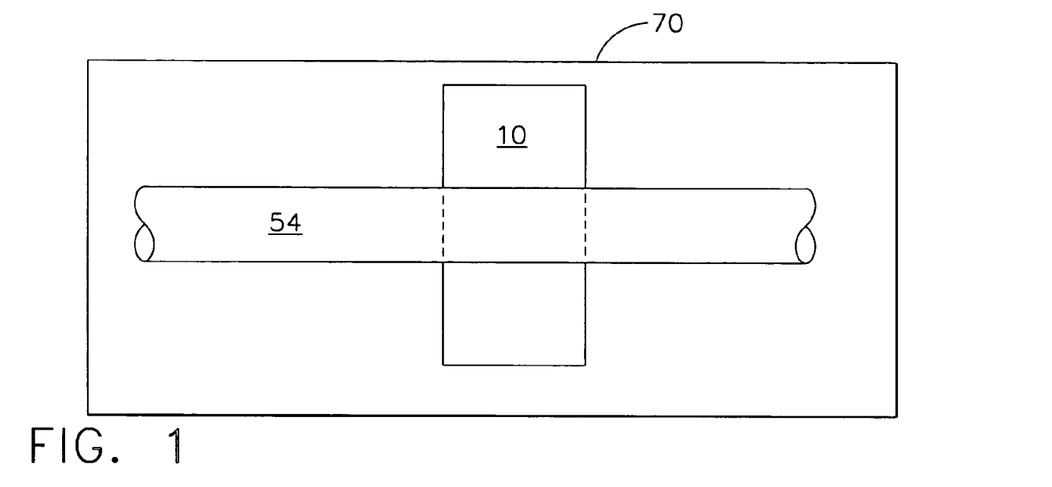
FIG. 1 schematically represents a gas turbine engine including a shaft coupled to a bearing assembly, according to an embodiment of the present invention.

In more specifically describing the present invention, and as can be appreciated from FIG. 1, in one embodiment the present invention may provide a gas turbine engine 70. The gas turbine engine 70 may comprise a shaft 54 and a bearing assembly 10 coupled to the shaft 54. The gas turbine engine 70, may be, as an example, an auxiliary power unit for an aircraft. Only a single bearing assembly 10 is shown in FIG. 1, it being understood that shaft 54 may be supported by two or more bearing assemblies 10. While the present invention is described in relation to a gas turbine engine 70, it is understood that the present invention can also be used with other equipment, such as automobiles with turbochargers.

Figure 2:
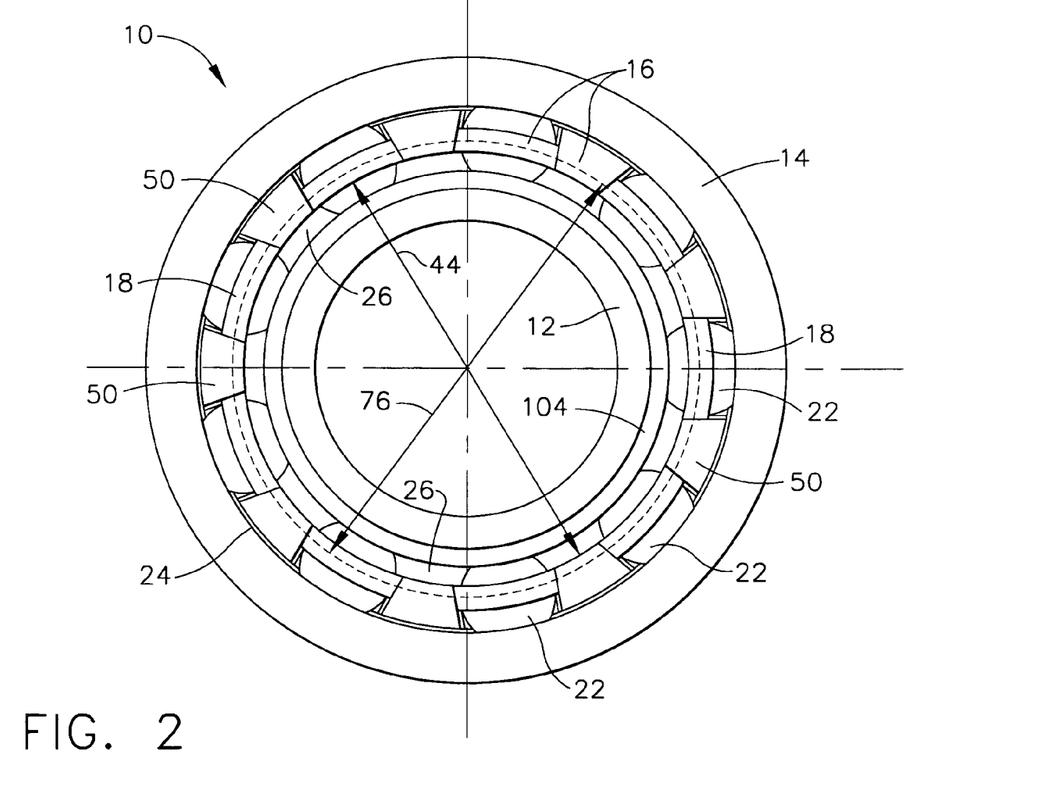
FIG. 2 is an axial view of a bearing assembly, according to another embodiment of the present invention.

With reference to FIG. 2, there is shown an axial view of a bearing assembly 10, according to an embodiment of the present invention. Bearing assembly 10 may comprise an inner raceway or ring 12, an outer raceway or ring 14, a cage assembly 16, and bearing balls 22. The inner raceway 12, the outer raceway 14, and the bearing balls 22 may be made from ceramic materials, or metals, such as steel. The cage assembly 16 may be placed between the inner raceway 12 and the outer raceway 14, such that the inner raceway 12, the cage assembly 16, and the outer raceway 14 are concentric. The outer raceway 14 may be concentric with the cage assembly 16 and radially outward from the cage assembly 16. The inner raceway 12 may be concentric with the cage assembly 16 and radially inward from the cage assembly 16. A pitch diameter 76 of the bearing balls 22 may be greater than the inner diameter 44 of a retaining ring 18.

Figure 3:
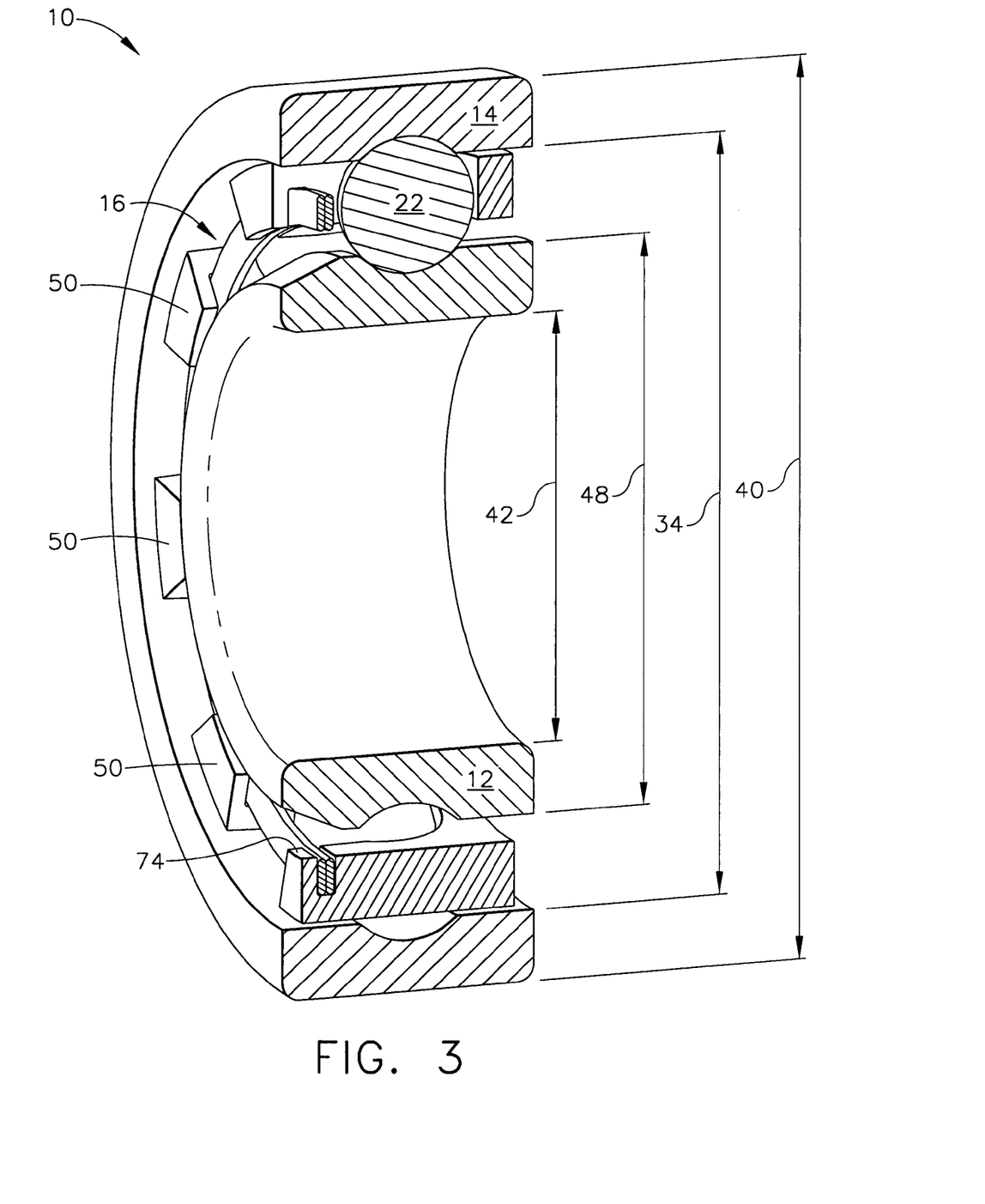
FIG. 3 is a perspective view, in section, of the bearing assembly of FIG. 2, according to an embodiment of the present invention.

FIG. 3 shows a perspective view, in section, of the bearing assembly 10 of FIG. 2. The inner raceway 12 may have an inner diameter 42 and an outer diameter 48. The outer raceway 14 may have an inner diameter 34 and an outer diameter 40.

Figure 4:
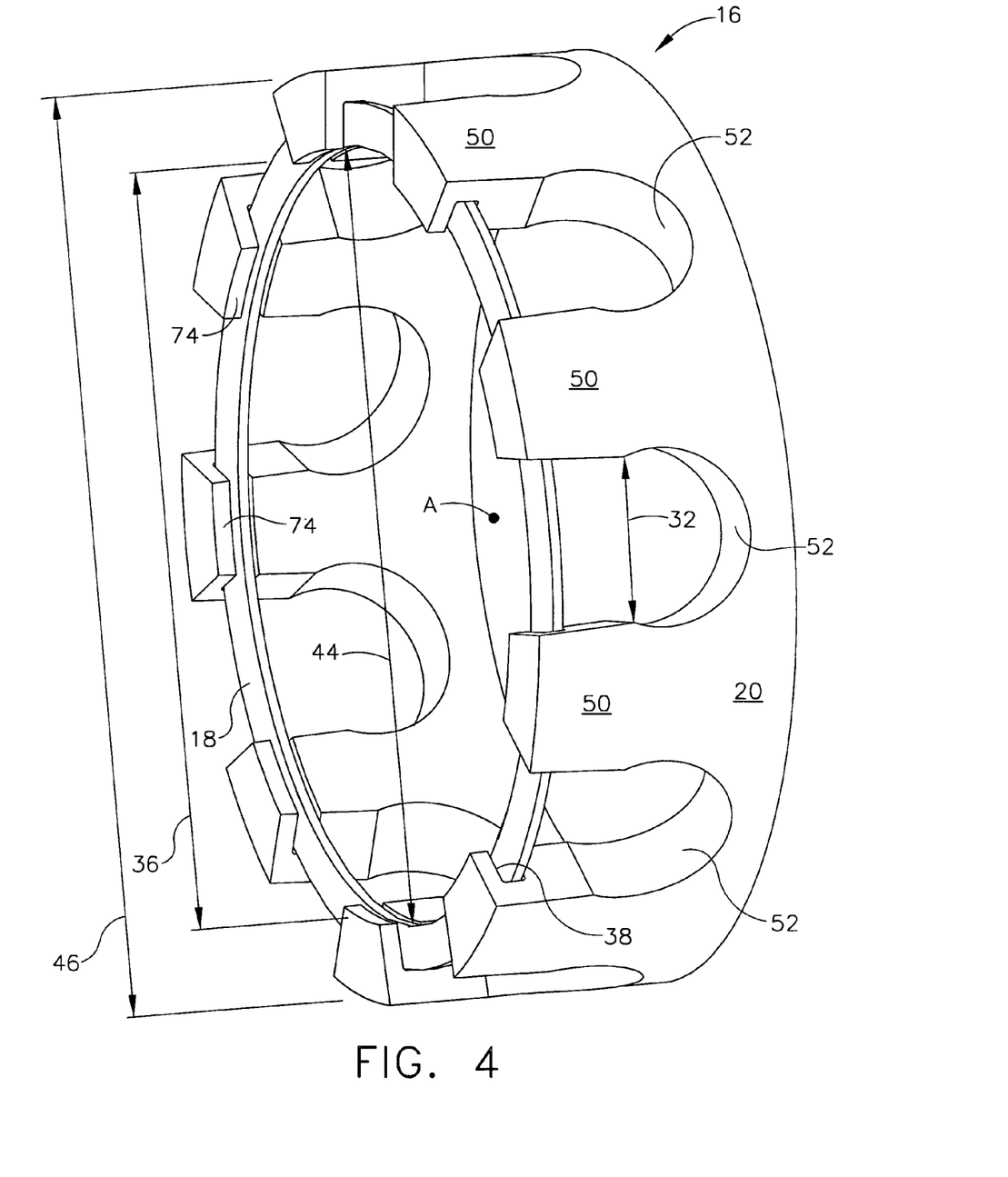
FIG. 4 is a perspective view of a cage assembly for the bearing assembly of FIG. 2, according to an embodiment of the present invention.

As shown in FIG. 4, the cage assembly 16 may comprise a cage 20, and a retaining ring 18, which may be affixed to the cage 20. The retaining ring 18 may be positioned or snapped into a groove 38 in the cage 20. The groove 38 may be defined by a recess within an inner face of each of the cage webs 50. An annular groove 38 may be formed in an inner face of each of the plurality of cage webs 50 and the annular groove 38 may be adapted for receiving the retaining ring 18. The cage 20 may be substantially cylindrical in shape, with a center A. The retaining ring 18 may be substantially circular in shape and serve to prevent the bearing balls 22 (shown in FIG. 2) from escaping the bearing assembly 10 should the bearing balls 22 (shown in FIG. 2) exit the pockets 52. The cage 20 may be comprised of a bronze or brass material or a metal, such as 4340 steel. The retaining ring 18 may comprised of a metal, such as a spring steel. The cage 20 and the retaining ring 18 may be plated with silver to enhance lubricity. The retaining ring 18 may have an inner diameter 44, which may be equal to an inner diameter 36 of the cage 20. The cage may also have an outer diameter 46. An inner face 74 may be flush with the inner diameter 44 of the retaining ring 18.

Continuing with FIG. 4, the cage 20 may comprise a plurality of pockets 52 for receiving the bearing balls 22 (shown in FIG. 2) and a corresponding plurality of cage webs 50, wherein each cage web 50 may be located between two adjacent pockets 52. The cage webs 50 may be spaced apart by restricting gaps 32.

Figure 5:
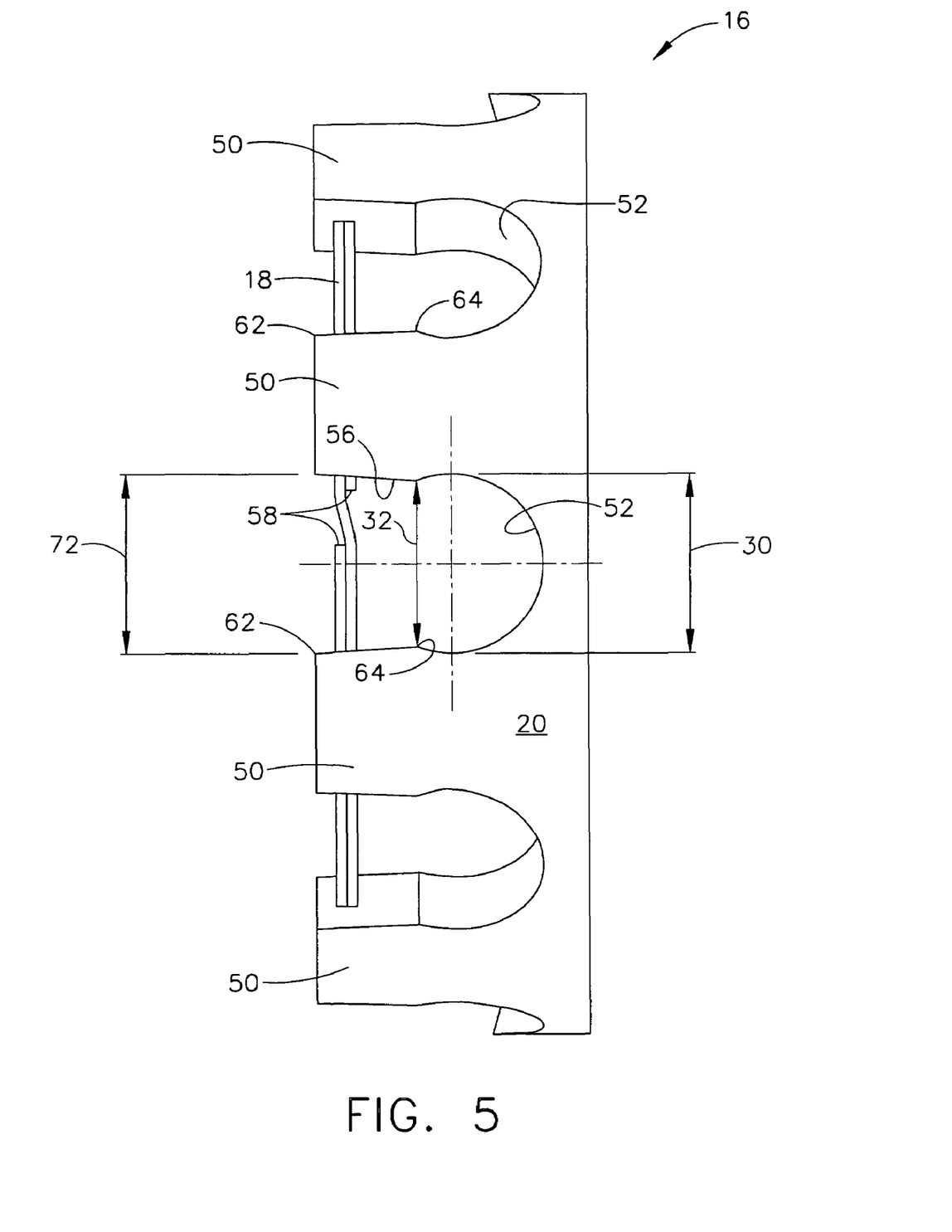
FIG. 5 is a plan view of a cage, according to an embodiment of the present invention.

FIG. 5 shows a cage assembly 16, according to one embodiment of the present invention. The cage webs 50 may be tapered (either tapered radially, tapered axially, or tapered both radially and axially). The plurality of cage webs 50 may be tapered such that the cage webs 50 are tapered towards a distal end 62 (and away from a proximal end 64) of the cage web 50. When the cage webs 50 are tapered in this manner, the assembly gaps 72 may be larger at the distal end 62 of the cage webs 50 and the restricting gaps 32 may be smaller at a proximal end 64, such that a bearing ball 22 can be snapped into, and retained within, the pocket 52 of the cage 20. The retaining ring 18 may have one, two, or more free ends 58.

Figure 6:
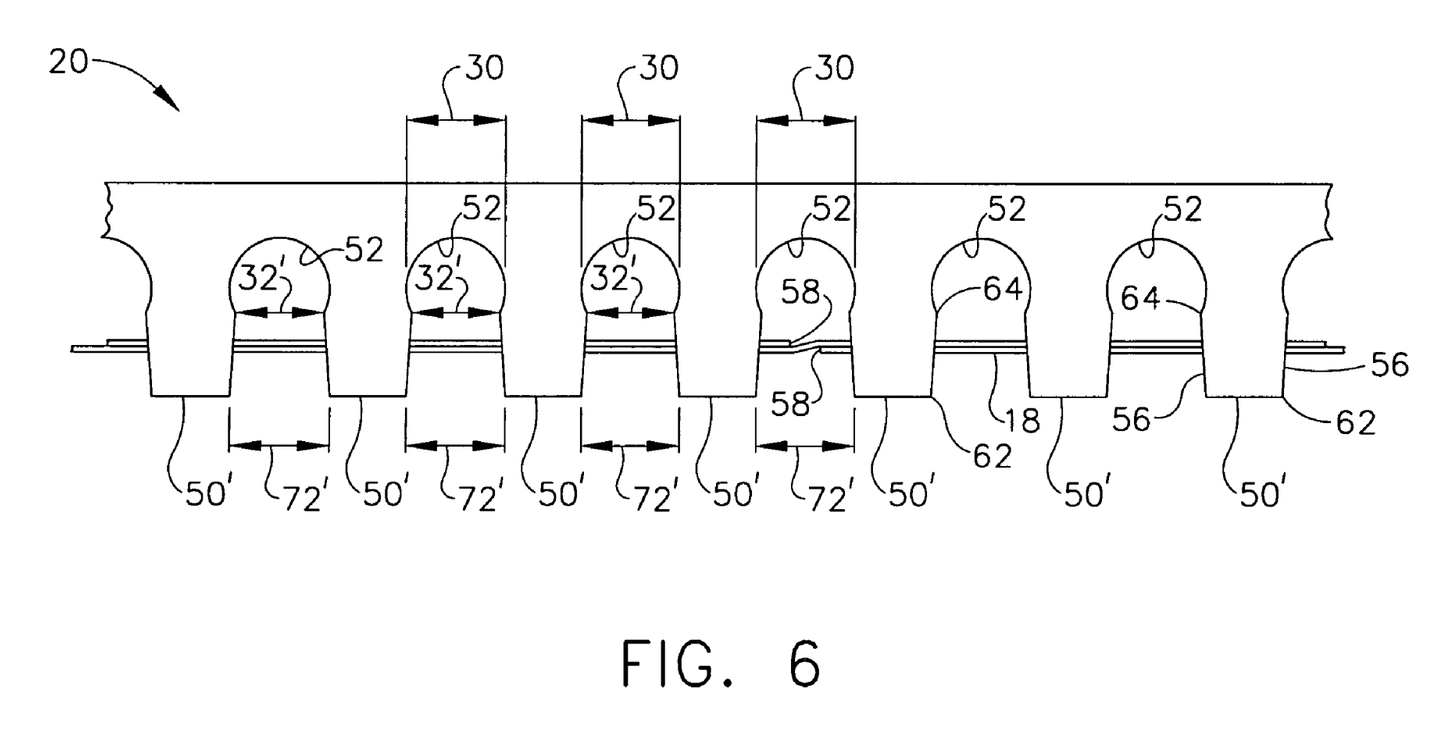
FIG. 6 is also a plan view of a portion of a cage in which an arc length of the cage has been straightened, according to another embodiment of the present invention.

Another embodiment of the present invention is shown in FIG. 6. The cage webs 50' are not necessarily tapered, but the restricting gaps 32' between the cage webs 50' may be smaller than the bearing ball 22 diameter, but large enough to allow bearing balls 22 to be snapped into position within the pocket 52'. The smaller size of the restricting gap 32' may prevent unintended removal of the bearing ball 22' during high speed rotation of the bearing assembly 10' (shown in FIG. 2). Assembly gaps 72' between distal ends 62 of webs 50' may be equal to the size of the restricting gaps 32'. The assembly gaps 72' may also be smaller than the bearing ball 22 diameter 27 (see FIG. 7).

Figure 7:
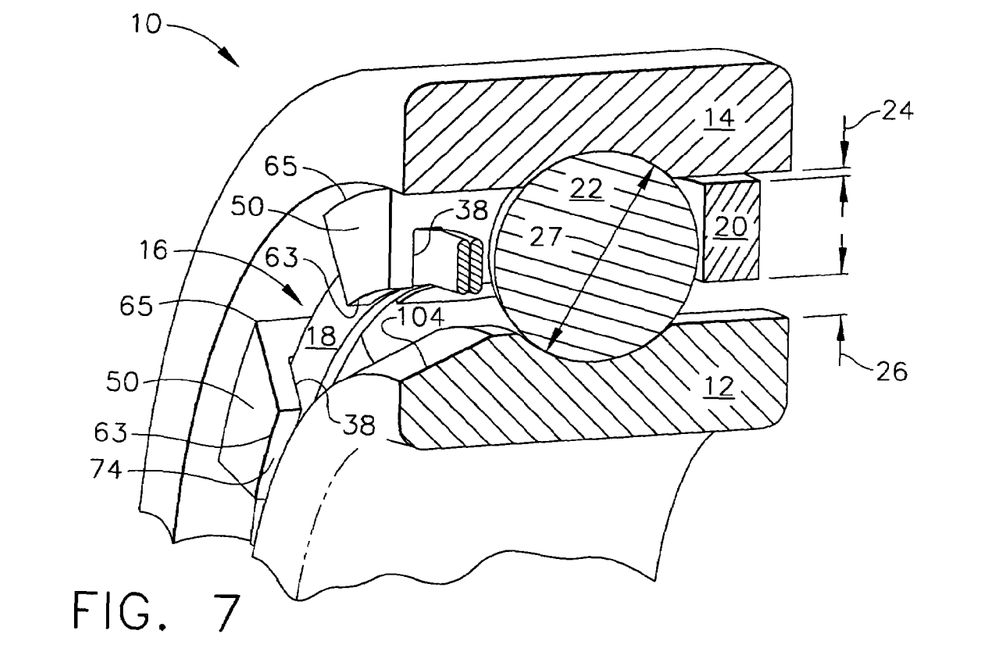
FIG. 7 is an enlarged view of a portion of the sectioned bearing assembly of FIG. 3.

FIG. 7 shows an enlarged view of a portion of the bearing assembly 10 of FIG. 3. A cage pilot clearance 24 may be provided between the outer raceway 14 and the cage 20. The inner raceway 12 may be concentric with the cage 20 and radially inward from the cage 20. The outer raceway 14 may be concentric with the cage 20 and radially outward from the cage 20. A cage non-pilot clearance 26 may be situated between the inner raceway 12 and the cage 20. The inner raceway 12 may comprise an inner raceway chamfer 104 for ease of handling the retaining ring 18 when inserting the retaining ring 18 into groove 38. The cage non-pilot clearance 26 may be greater than the cage pilot clearance 24. The cage non-pilot clearance 26 may be about 2.3 times the size of the cage pilot clearance 24. For example, the cage non-pilot clearance 26 may be about 0.035 inch (0.089 centimeter) and the cage pilot clearance 24 may be about 0.015 inch (0.038 centimeter). In some embodiments, the cage assembly 16 may have single land piloting, wherein the cage may have a single cage pilot surface located on the outer diameter 46 of the cage 20 by the inner diameter 34 of the outer raceway 14. The cage webs 50 may taper radially inward (from broad to narrow) towards a distal end 63 and away from a proximal end 65.

The bearing ball 22 diameter 27 is normally smaller than the pocket diameter 30. The assembly gap 72 between the cage webs 50 at the distal end 62 may be made, but not necessarily be, equal to the pocket diameter 30, but the assembly gap 72 may also be not equal to the pocket diameter 30 from FIG. 6. This could aid in the assembly of the cage 20 into the bearing assembly 10.

Figure 8:
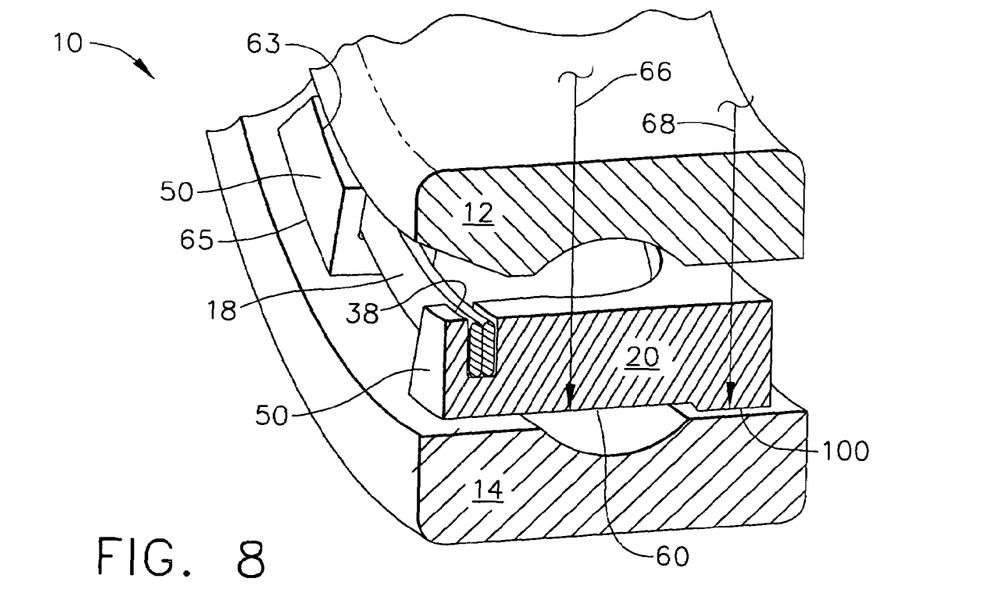
FIG. 8 is another enlarged view, in section, of the sectioned bearing assembly of FIG. 3, according to the present invention.

Outer land piloting may be understood by reference to FIG. 8, which shows, in section, a portion of a bearing assembly 10, according to yet another embodiment of the present invention. A cage relief surface 60 may be machined on the outer diameter 46 of the cage 20 to increase the space between the cage 20 and the outer raceway 14. This may be advantageous during high speed operation of bearing assembly 10 wherein the cage webs 50 may flare radially outward due to centrifugal forces on the cage 20 by rotational inertia. The cage relief radius 66 (shown in FIG. 8) of the cage 20, measured radially from the center A of cage 20 to the cage relief surface 60, may be less than a cage pilot radius 68 of the cage 20, measured radially from the cage center to a cage pilot surface 100. Thus, the bearing assembly 20 may be piloted on the outer diameter 46 from FIG. 4 of the cage 20 by the inner diameter 34 from FIG. 3 of the outer raceway 14.

Figure 9:
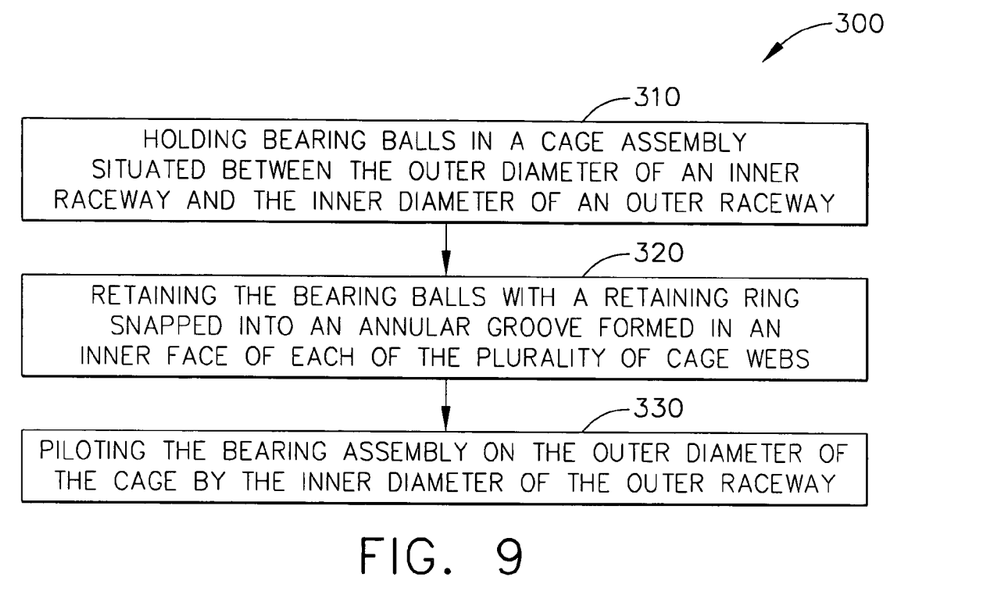
FIG. 9 schematically represents a series of steps of a method for retaining a bearing ball within a bearing assembly, according to another embodiment of the present invention.

It can be seen in FIG. 9 that the present invention also provides a method 300 of retaining a plurality of bearing balls 22 and retaining a cage assembly 16 within a bearing assembly 10. The method 300 may comprise a step 310 of holding or separating bearing balls 22 in a cage assembly 16 situated between the outer diameter 48 of an inner raceway 12 and the inner diameter 34 of an outer raceway 14. The ball bearings 22 may be separated by the cage webs 50 of the cage 20. Next, a step 320 may comprise retaining the bearing balls with a retaining ring snapped into an annular groove formed in an inner face of each of the plurality of cage webs. A step 330 may comprise piloting the bearing assembly 10 on the outer diameter 46 of the cage 20 by the inner diameter 34 of the outer raceway 14. The cage pilot clearance 24 may be less than the cage non-pilot clearance 26. The inner diameter 44 of the retaining ring 18 may be equal to an inner diameter 36 of the cage 20.

Figure 10:
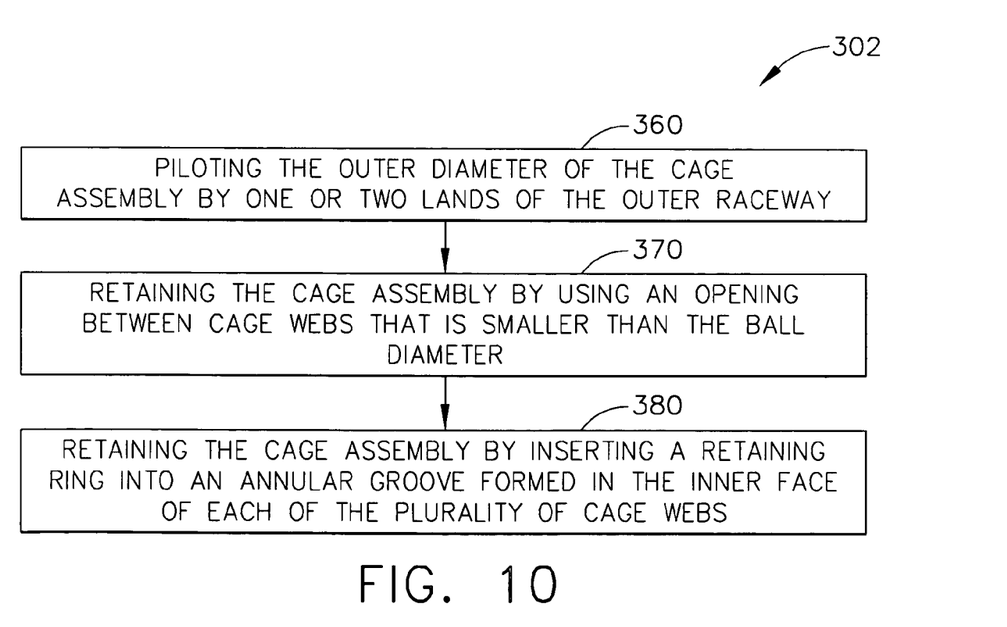
FIG. 10 schematically represents a series of steps of a method of cage retention, according to yet another embodiment of the present invention.

In FIG. 10, it can be seen that the present invention also provides a method 302 of cage retention. The method 302 may comprise a step 360 of piloting the outer diameter of the cage assembly by one or two lands of the outer raceway. Next, a step 370 may comprise retaining the cage assembly by using an opening between cage webs that is smaller than the bearing ball diameter. Thereafter, a step 380 may comprise retaining the cage assembly by inserting a retaining ring into an annular groove formed in the inner face of each of the of cage webs.

The cage assembly 16 used in methods 300 and 302 may comprise a cage 20 (with cage webs 50, restricting gaps 32, assembly gaps 72, gaps 56, and pockets 52) and a retaining ring 18, which may be positioned or snapped into a groove 38 in the cage 20. The cage 20 and the retaining ring 18 may be comprised of a metal, such as 4340 steel. The cage 20 and the retaining ring 18 may be plated with silver to enhance lubricity. The retaining ring 18 may have an inner diameter 44, which may be equal to an inner diameter 36 of the cage 20. The cage webs 50 may be tapered (either tapered radially, tapered axially, or tapered both radially and axially).

It should be understood, of course, that the foregoing relates to exemplary embodiments of the invention and that modifications may be made without departing from the spirit and scope of the invention as set forth in the following claims.

I claim:

1. A bearing assembly, comprising:
   a plurality of bearing balls;
   a cage, including a plurality of pockets, a plurality of cage webs, an outer surface, a relief radius, a pilot radius, and a center, the plurality of pockets including the bearing balls disposed therein, the plurality of cage webs each located between an adjacent pair of the pockets, the outer surface comprising a relief surface and a pilot surface, the relief radius measured radially from the center to the relief surface, and the pilot radius measured radially from the center to the pilot surface, the pilot radius being greater than the relief radius; and
   a retaining ring affixed to the cage, wherein an inner diameter of the cage is equal to an inner diameter of the retaining ring.

2. The bearing assembly of claim 1, further comprising an outer raceway concentric with the cage and radially outward from the cage, wherein a cage pilot clearance is located between the outer raceway and the cage.

3. The bearing assembly of claim 2, further comprising an inner raceway concentric with the cage and radially inward from the cage, wherein a cage non-pilot clearance is located between the inner raceway and the cage.

4. The bearing assembly of claim 3, further comprising an inner raceway chamfer.

5. The bearing assembly of claim 3, wherein the cage non-pilot clearance is greater than the cage pilot clearance.

6. A bearing assembly, comprising:
   a plurality of bearing balls;
   a cage, including a plurality of pockets, a plurality of cage webs, an outer surface, a relief radius, a pilot radius, and a center, the plurality of pockets including the bearing balls disposed therein, the plurality of cage webs each located between an adjacent pair of the pockets, the outer surface comprising a relief surface and a pilot surface, the relief radius measured radially from the center to the relief surface, and the pilot radius measured radially from the center to the pilot surface, the pilot radius being greater than the relief radius;
   an inner raceway concentric with the cage;
   an outer raceway concentric with the cage and the inner raceway; and
   a retaining ring concentric with the cage, the inner raceway, and the outer raceway, the retaining ring having an inner diameter that is equal to an inner diameter of the cage;
   wherein a cage pilot clearance is located between the outer raceway and the cage; wherein a cage non-pilot clearance is located between the inner raceway and the cage; and wherein the cage non-pilot clearance is greater than the cage pilot clearance.

7. The bearing assembly of claim 6, wherein the cage non-pilot clearance is about 2.3 times the size of the cage pilot clearance.

8. The bearing assembly of claim 6, wherein the cage non-pilot clearance is about 0.032 inch (0.089 centimeter) and the cage pilot clearance is about 0.012 inch (0.038 centimeter).

9. A gas turbine engine, comprising:
a shaft; and
a rolling element bearing coupled to the shaft;
   the rolling element bearing comprising:
      a plurality of bearing balls;
      a cage, including a plurality of pockets, a plurality of cage webs, an outer surface, a relief radius, a pilot radius, and a center, the plurality of pockets including the bearing balls disposed therein, the plurality of cage webs each located between an adjacent pair of the pockets, the outer surface comprising a relief surface and a pilot surface, the relief radius measured radially from the center to the relief surface, and the pilot radius measured radially from the center to the pilot surface, the pilot radius being greater than the relief radius; and
      a retaining ring coupled to the cage having an inner diameter that is equal to an inner diameter of the cage.

10. A bearing assembly, comprising:
a plurality of bearing balls;
a cage including a plurality of pockets, a plurality of cage webs, an outer surface, a relief radius, a pilot radius, and a center, the plurality of pockets including the bearing balls disposed therein, the plurality of cage webs each located between an adjacent pair of the pockets, the outer surface comprising a relief surface and a pilot surface, the relief radius measured radially from the center to the relief surface, and the pilot radius measured radially from the center to the pilot surface, the pilot radius being greater than the relief radius;
an inner raceway concentric with the cage and radially inward from the cage;
an outer raceway concentric with the cage and radially outward from the cage; and
a retaining ring affixed to the cage, wherein an inner diameter of the retaining ring is equal to an inner diameter of the cage.

11. The bearing assembly of claim 10, wherein a distance between an adjacent pair of the cage webs is less than a diameter of said bearing ball located between the adjacent pair of the cage webs.

12. The bearing assembly of claim 10, wherein each adjacent pair of the cage webs has a gap therebetween, the gap leading to a corresponding one of the plurality of pockets.

* * * * *

UNITED STATES PATENT AND TRADEMARK OFFICE
CERTIFICATE OF CORRECTION

PATENT NO. : 7,364,365 B2  Page 1 of 1
APPLICATION NO. : 11/001452
DATED : April 29, 2008
INVENTOR(S) : Louis P. Begin It is certified that error appears in the above-identified patent and that said Letters Patent is hereby corrected as shown below:

Column 8, line 65, "0.032 inch" should be changed to --0.035 inch--;
Column 8, line 66, "0.012 inch" should be changed to --0.015 inch--.

Signed and Sealed this

Second Day of September, 2008

JON W. DUDAS
*Director of the United States Patent and Trademark Office*